United States Patent Office 3,141,904
Patented July 21, 1964

3,141,904
PRODUCTION OF CRYSTALLINE POTASSIUM SORBATE FROM SORBIC ACID AND POTASSIUM CARBONATE
Everett R. Lashley, Charleston, and Richard C. Myerly, South Charleston, W. Va., assignors to Union Carbide Corporation, a corporation of New York
No Drawing. Filed Aug. 29, 1961, Ser. No. 134,583
1 Claim. (Cl. 260—526)

This invention relates to a process for the production of potassium sorbate. More particularly, the invention relates to the production of potassium sorbate crystals of relatively large size.

It is well known to prepare potassium sorbate by reacting sorbic acid with a potassium salt in an organic reaction medium. Commonly employed reaction media are liquid hydrocarbons, both aliphatic and aromatic, and hydrocarbon-lower alcohol mixtures. Several serious disadvantages are inherent in such known processes due to the small size of the potassium sorbate crystals produced, both during the reaction and in the separation of the crystals from the reaction medium. For example, the small size of the potassium sorbate crystal produced limits the concentration of the reactants in the reaction medium, i.e. the amount of potassium sorbate produced per unit of reactor volume, in that an excessively thick slurry is formed if said concentration exceeds a certain level. Such excessive thickening of the slurry makes effective agitation difficult, thereby necessitating long reaction times and resulting in non-uniform product crystals. In order to avoid these difficulties, large reactor volume reactions per unit of potassium sorbate produced are required and high equipment costs result. Furthermore, the small size of the potassium sorbate crystals produced by processes known to the art render filtration or centrifugation processes, to separate the crystals from the reaction medium inefficient, incomplete, and slow. Thus, when filtering the reaction mixture through a filter having sufficiently small pores to insure complete retention of the solid crystals, rapid plugging of the filter pores occurs, making frequent time-consuming solids removal operations necessary. Alternatively, if the filter pores are of sufficient size to permit rapid and continuous flow-through, loss of product through the filter occurs and the recovered reaction medium is contaminated. Similarly, when centrifuging to separate the crystal products from the reaction medium, problems such as clogging of the centrifuge basket screen or excessive product contamination due to entrained solvent results.

The process of the present invention significantly reduces the difficulties inherent in known processes by providing for the formation of potassium sorbate crystals that are substantially larger and more uniform than those provided by known processes. In addition, the potassium sorbate crystals produced in the present process are easier to handle and thus rendered more useful in varied applications than previously obtainable potassium sorbate, without sacrifice in purity, color, or appearance. As illustrative of the degree of improvement in crystal size and shape obtainable by using the present invention, there can be mentioned that, under substantially identical reaction conditions, potassium sorbate flake-like crystals averaging about 1000 by 100 microns in size are produced by the present invention, whereas fine needle-like crystals averaging about 100 microns or less in length are produced by known processes.

In a broad aspect, the process of this invention comprises the steps of (a) contacting, in a reaction zone, sorbic acid with a potassium salt in a reaction medium comprised of water and an inert organic vehicle immiscible therewith, said sorbic acid being soluble in said inert organic vehicle, (b) digesting the resulting potassium sorbate reaction product mixture, and (c) removing water from said reaction zone.

The reaction between sorbic acid and potassium salt, step (a) above, can be carried out of temperatures ranging from about 20° C. to about 80° C., but is preferably effected between about 20° C. and about 40° C., while maintaining a pressure sufficient to maintain the reaction medium in an essentially liquid state. In a preferred embodiment, the potassium salt is gradually added, with stirring, to a mixture of sorbic acid in the reaction medium, at room temperature and at atmospheric pressure.

The digestion step, step (b) above, can be carried out at temperatures of from about 50° C. to about 150° C., and preferably from about 80° C. to about 100° C., preferably under vigorous agitation. Generally, the crystal growth period, defined as that time during which the potassium sorbate crystals are digested, i.e., maintained within the digestion temperature range, in the presence of water, is not narrowly critical. The crystal growth period can vary from about 30 minutes to about 6 hours, but is generally optimum between about 2 hours and about 4 hours.

The water removal step, step (c) above, is conveniently carried out by distillation. The water can be removed at any convenient temperature, for example, between about 60° C. and about 110° C., depending on the inert organic vehicle employed, over a period of from 30 minutes to about 6 hours, and preferably over a period of from about 2 hours to about 4 hours.

It should be noted that while steps (a), (b), and (c) can be carried out in sequence, in a preferred embodiment of the invention steps (b) and (c) can be carried out simultaneously by heating the reaction product mixture to the digestion temperature while continuously collecting water as distillate. More specifically, when employing an inert organic vehicle that forms an azeotrope with water, steps (b) and (c) can be carried out simultaneously by heating the reaction product mixture to the boiling point of the resulting azeotrope, distilling off said azeotrope, and recovering same as distillate which separates into an upper organic phase and a lower aqueous phase. If desired, the organic phase can be recycled to the reaction zone.

Illustrative potassium compounds which can be used in this invention are water soluble basic compounds such as potassium hydroxide, and potassium carbonate, and the like. Potassium carbonate is preferred.

The inert organic vehicles utilizable in the invention are the normally liquid organics in which sorbic acid is soluble and which are immiscible with water, and particularly those that form azeotropes with water. In general, inert organic vehicles having boiling points between about 30° C. and about 150° C., and preferably between about 80° C. and about 110° C., can be employed. In order to carry out the digestion step at the preferred reaction temperature while simultaneously distilling the reaction medium at atmospheric pressure, inert organic vehicles forming water azeotropes boiling within the preferred digestion temperature range are advantageously employed. If inert organic vehicles that form water azeotropes having boiling points substantially higher than the desired digestion temperature are employed, the digestion step can be carried out at reduced pressure to permit simultaneous water removal.

Illustrative of the inert organic vehicles are the lower aliphatic hydrocarbons such as pentane, hexane, heptane, octane, dodecane, and the like; the aromatic hydrocarbons such as benzene, toluene, xylene, ethylbenzene, and the like; the organic ethers, for example, ethyl butyl ether, dibutyl ether, and the like; the saturated aliphatic hydrocarbon alcohols such as ethanol, propanol, butanol, pentanol, hexanol, heptanol, and the like; and the chlorinated hydrocarbons such as carbon tetrachloride, ethylene dichloride, perchloroethylene, and the like.

Particularly preferred as the inert organic vehicle, because of its desirable physical characteristics and availability, is heptane.

The ratio of water to organic solvent is not narrowly critical. Generally, the reaction medium can contain from about 2 percent, and lower, to about 20 percent, and higher, by volume, and preferably from about 5 percent to about 10 percent water by volume. When using less than about 2 volume percent of water the size of the resulting potassium sorbate crystals is often not appreciably increased, while employing volumes of water greater than 20 percent of the reaction medium volume results in little improvements in product crystal size.

The amount of reaction medium employed should be such that the concentration of solids therein does not exceed about 40 percent by weight of the total reaction mixture. Preferably slurries containing 25 percent or less solids can be handled effectively and some improvements can be obtained above such a concentration.

The following examples are illustrative.

*Example I*

To a 3-liter reaction flask equipped with a mechanical agitator, reflux condenser with decanter, and electric heating mantle, were charged 1125 milliliters (about 770 grams) of heptane, 130 milliliters of water, and 106 grams of sorbic acid. To the resulting mixture was added 62.5 grams of anhydrous potassium carbonate, with stirring, over a period of thirty minutes at room temperature. The resulting reaction mixture was then heated at reflux temperature (77° C. to 96° C.) over a period of two hours while collecting a heptane-water medium as distillate. The distillate was allowed to form a water layer and a heptane layer in the decanter. The water layer then was removed, and the heptane layer was continuously recycled to the reaction flask. After this period of time substantially all the water had been removed from the resulting reaction product mixture. This product mixture was cooled and the crystals which had formed were filtered and dried on a laboratory vacuum filter. The yield of dry crystalline potassium sorbate was 138 grams. Examination of the product crystals under a microscope showed them to be fairly uniform flake-like crystals, which averaged about 1000 by 100 microns in size.

In analogous fashion, as above, substantially similar results are obtained when employing toluene, dibutyl ether, butanol, or ethylene dichloride in place of heptane.

To compare the efficacy of the process of the present invention with that of known processes, the following experiments, employing heptane and heptane-ethanol reaction media, respectively, were carried out.

*Example II*

A mixture of 1250 milliliters of heptane and 106 grams of sorbic acid was placed in the equipment described in Example I, and 62.5 grams of potassium carbonate was added to the mixture, with stirring, over a period of 30 minutes at room temperature. A thick slurry formed in the reaction flask and agitation became difficult, even at the reflux temperature of 78° C. After 3.5 hours of agitation at reflux temperature, the slurry was allowed to cool and the heptane was removed from the reaction mixture by filtration to yield 137 grams of crystalline potassium sorbate product. Examination of the product crystals under a microscope showed them to be non-uniform, thin, and needle-like, with lengths of about 100 microns.

*Example III*

A mixture of 1125 milliliters of heptane, 125 milliliters of ethanol and 106 grams of sorbic acid was placed in the equipment described in Example I, and 62.5 grams of potassium carbonate was added to the mixture, with stirring, over a period of thirty minutes at room temperature. A thick slurry formed and agitation became difficult, even at the reflux temperature of 70–73° C. After three hours of agitation at room temperature, the slurry was allowed to cool and the heptane-ethanol mixture removed by filtration to yield 120 grams of crystalline potassium sorbate product. Examination of the product crystals under a microscope showed them to be non-uniform, thin and needle-like with lengths ranging from 200 to 300 microns.

What is claimed is:

A process for the production of crystalline potassium sorbate which comprises contacting, in a reaction zone, sorbic acid with potassium carbonate in a reaction medium consisting essentially of heptane and 5 to 10 volume percent water, digesting the resulting product mixture at from 80° C. to 100° C., and removing substantially all of the water from said reaction zone by azeotropic distillation over a period of from about 2 to 4 hours.

References Cited in the file of this patent

FOREIGN PATENTS 1,045,390    Germany _____ Dec. 4, 1958

OTHER REFERENCES

Weissberger: "Technique of Organic Chemistry," vol. IV, p. 374 (1951).